United States Patent [19]
Kuroyama et al.

[11] Patent Number: 5,569,862
[45] Date of Patent: Oct. 29, 1996

[54] HIGH-PRESSURE PHASE BORON NITRIDE SINTERED BODY FOR CUTTING TOOLS AND METHOD OF PRODUCING THE SAME

[75] Inventors: Yutaka Kuroyama, Chita-Gun; Mitsuhiro Furuta, Tokoname, both of Japan

[73] Assignee: NOF Corporation, Tokyo, Japan

[21] Appl. No.: 403,264

[22] Filed: Mar. 13, 1995

[30] Foreign Application Priority Data

Apr. 21, 1994 [JP] Japan .................................. 6-083033

[51] Int. Cl.⁶ .................................................. C22C 29/16
[52] U.S. Cl. ............................ 75/238; 428/627; 428/698; 501/96
[58] Field of Search .................................. 419/10, 12, 13, 419/48; 428/627, 698; 501/96; 75/230, 238

[56] References Cited

U.S. PATENT DOCUMENTS

| | | |
|---|---|---|
| 4,334,928 | 6/1982 | Hara et al. ................................. 75/238 |
| 4,343,651 | 8/1982 | Yazu et al. ................................. 75/238 |
| 4,375,517 | 3/1983 | Watanabe et al. ......................... 501/87 |
| 4,619,698 | 10/1986 | Ueda et al. ................................. 75/238 |
| 4,693,746 | 9/1987 | Nakai et al. ............................... 75/238 |
| 4,788,166 | 11/1988 | Araki et al. ............................... 501/96 |
| 4,911,756 | 3/1990 | Nakai et al. ............................... 75/238 |
| 5,092,920 | 3/1992 | Nakai et al. ............................... 75/238 |
| 5,200,372 | 4/1993 | Kuroyama et al. ........................ 501/96 |
| 5,326,380 | 7/1994 | Yao et al. .................................. 51/293 |

FOREIGN PATENT DOCUMENTS 54-66910  5/1979  Japan .
57-67081  4/1982  Japan .

*Primary Examiner*—Charles T. Jordan
*Assistant Examiner*—Chrisman D. Carroll
*Attorney, Agent, or Firm*—Watson Cole Stevens Davis, P.L.L.C.

[57] ABSTRACT

A high-pressure phase boron nitride sintered body for cutting tools consists of a high-pressure phase boron nitride and an intermetallic compound containing a titanium carbonitride Ti(C,N) and at least one metal of Al, W, Co and Zr, and is produced by mixing the above components, and then sintering at a temperature of not lower than 1000° C. under a pressure of not less than 2.4 GPa but less than 4 GPa.

1 Claim, 3 Drawing Sheets

FIG_1

HIGH-PRESSURE PHASE BORON NITRIDE SINTERED BODY FOR CUTTING TOOLS AND METHOD OF PRODUCING THE SAME

BACKGROUND OF THE INVENTION

1. Field of the Invention

This invention relates to a high-pressure phase boron nitride for cutting tools capable of using in the cutting of high-hardness quenched steel, hard-cutting iron-based material or the like and a method of producing the same.

2. Description of the Related Art

As the high-pressure phase boron nitride, there are two types of cubic system and wurtzite, which have a hardness next to diamond and are usable as a tool material for polishing, grinding and cutting iron-based materials.

In general, cubic boron nitride (cBN) is synthesized under a statically super-high pressure using a catalyst (statically super-high pressure process), while wurtzite type boron nitride (wBN) is synthesized under an impact super-high pressure through explosion of explosive compound or the like without catalyst (impact super-high pressure process).

There are known the following sintered body containing the above high-pressure phase boron nitride and a method of producing the same.

In JP-A-57-67081 is disclosed a high hardness sintered body containing (1) 10–90 volume% of high-pressure phase boron nitride, (2) 89–9 volume% of titanium carbonitride Ti(C,N) in which an atomic weight of C is larger than that of N, and (3) not less than 1 volume% in total of aluminum and aluminum nitride. Furthermore, there is described a method of producing such a high hardness sintered body by subjecting the above mixture to a sintering treatment at a temperature of not lower than 1200° C. under a pressure of not less than 4 GPa.

On the other hand, JP-A-54-66910 discloses a sintered body for a high hardness tool obtained by hot-pressing (1) wBN and (2) a carbonitride represented by $M(C,N)_{1\pm x}$ when a metal of Group 4a, 5a in Periodic Table is M in which an atomic volume ratio of nitrogen and carbon bonded to the metal M is $N \geq C$, or (1') wBN and (2') powder of a compound mainly composed of nitride represented by $MN_{1\pm x}$ at a high temperature under a high pressure, wherein the sintered body comprises not less than 10 volume% in total of high-pressure phase boron nitride consisting of wBN and cBN converted from a part or whole of wBN in the sintering and the balance being mainly a compound of M and this compound is a solid solution of M—N—O or M—N—C—O in the sintered body. And also, there is disclosed a sintered body for a high hardness tool in which the above sintered body contains not less than 0.1% by weight in total of Al and/or Si in form of an intermetallic compound existing on phase diagrams of M—Al and M—Si.

In the sintered body of JP-A-57-67081, however, the preset range of each of N and C is wide, so that free carbon is created or brittle compound is formed and hence the sintered body exhibiting an excellent cutting performance is not obtained.

In the sintered body of JP-A-54-66910, $N \geq C$ is preferable as compared with $N \geq C$ in the carbonitride $M(C,N)_{1\pm x}$ because the abrasion resistance and hardness of solid solution formed in the sintered body are excellent and the roughness of cut surface after the cutting is good and the occurrence of free carbon resulting in the formation of pores is relatively small. Even in this case, the sintered body is not yet sufficient in the abrasion resistance and cutting performance, so that it is required to have a higher cutting performance.

SUMMARY OF THE INVENTION

It is, therefore, an object of the invention to provide a high-pressure phase boron nitride sintered body for cutting tools having excellent abrasion resistance and hardness and a method of producing the same.

According to a first aspect of the invention, there is the provision of a high-pressure phase boron nitride sintered body for cutting tools consisting of (1) 20–80% by weight of a high-pressure phase boron nitride and (2) 80–20% by weight of an intermetallic compound containing a titanium carbonitride Ti(C,N) in which an atomic weight ratio of nitrogen (N) to carbon (C) is $N/C \leq 0.15$ and at least one metal selected from the group consisting of Al, W, Co and Zr.

According to a second aspect of the invention, there is the provision of a method of producing a high-pressure phase boron nitride sintered body for cutting tools, which comprises mixing (1) 20–80% by weight of a high-pressure phase boron nitride with (2) 80–20% by weight of an intermetallic compound containing a titanium carbonitride Ti(C,N) in which an atomic weight ratio of nitrogen (N) to carbon (C) is $N/C \leq 0.15$ and at least one metal selected from the group consisting of Al, W, Co and Zr, and then sintering at a temperature of not lower than 1000° C. under a pressure of not less than 2.4 GPa but less than 4 GPa.

BRIEF DESCRIPTION OF THE DRAWINGS

The invention will be described with reference to the accompanying drawings, wherein.

DESCRIPTION OF THE PREFERRED EMBODIMENTS

Figure 1:
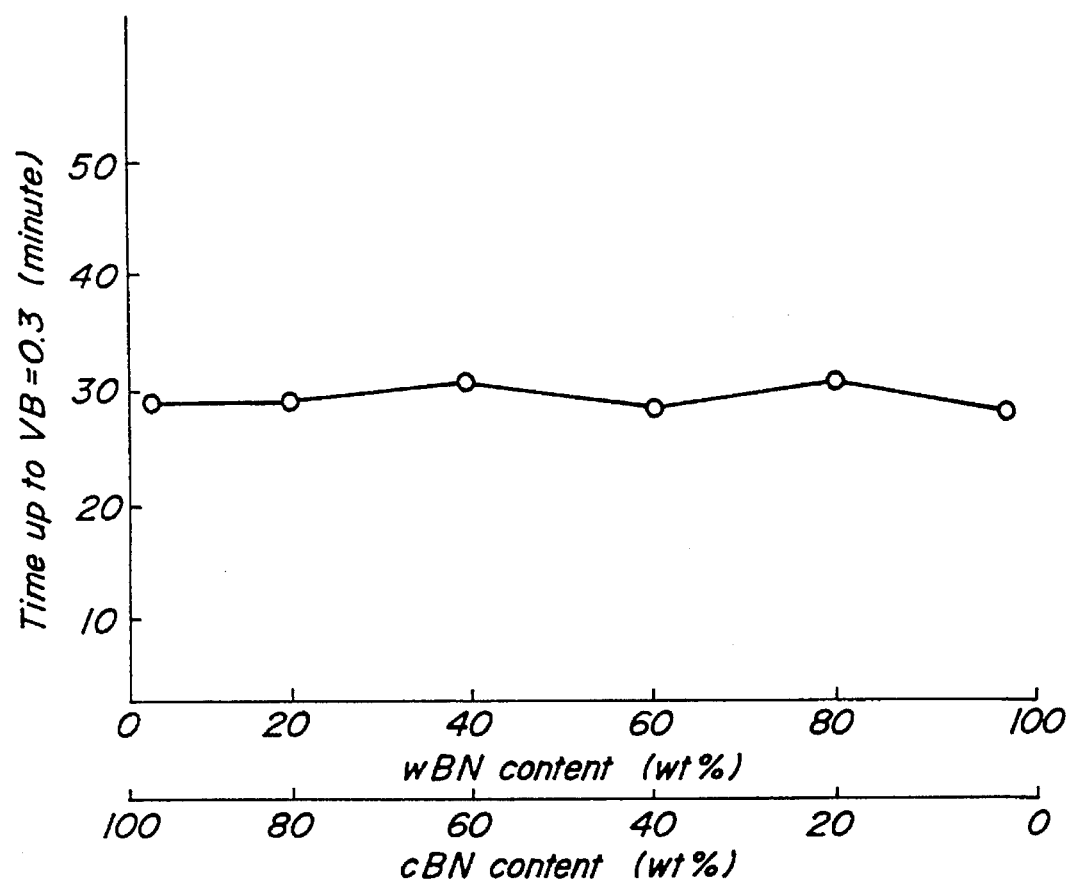
FIG. 1 is a graph showing a relation containing wearing time and a ratio of wBN content to cBN content.

At first, the invention will be described with respect to the high-pressure phase boron nitride sintered body for cutting tools.

As the high-pressure phase boron nitride, there are cBN and wBN as mentioned above. According to the invention, cBN and/or wBN may be used.

In the sintered body according to the invention, when the content of the high-pressure phase boron nitride is less than 20% by weight, the abrasion resistance is poor, while when it exceeds 80% by weight, the resistance to wearing-away is poor and it is inconvenient as a cutting tool.

A binder is used in the preparation of the high-pressure phase boron nitride sintered body according to the invention because the high-pressure phase boron nitride is very hard and is difficult to be sintered alone and further the cutting performance is improved by composite formation when the resulting sintered body is used as a tool.

Furthermore, the high-pressure phase boron nitride is high in the hardness, toughness and thermal conductivity and has a very excellent property as a tool material that it hardly reacts with an iron-based material to be cut even at a higher temperature. For this end, it is required that the binder to be used does not damage the above properties of the high-pressure phase boron nitride in the composite formation.

In the invention, the intermetallic compound containing a titanium carbonitride Ti(C,N) and at least one metal selected from the group consisting of Al, W, Co and Zr is used as the binder. The reason why the intermetallic compound is used instead of Ti(C,N) is due to the fact that it is sufficient in the toughness and hardly wears away even when the sintered body is used under severer conditions.

The titanium carbonitride Ti(C,N) is a solid solution of TiC and TiN, which may be previously formed before the sintering or be formed from TiC and TiN during the sintering. Since TiC is high in the hardness and TiN is excellent in the toughness, Ti(C,N) possesses good properties of both TiC and TiN.

In the titanium carbonitride Ti(C,N), when the atomic weight ratio is $N \geq C$, the hardness is low and the abrasion resistance is poor, while when it is $0.15 < N/C < 1$, the composition forming free carbon or a brittle compound frequently appears and the fine structure of the sintered body is not obtained and hence the good cutting performance is not developed. On the contrary, when it is $N/C \leq 0.15$, the free carbon or the brittle compound resulting in the degradation of the cutting performance is not formed and also the structure of the sintered body becomes finer as compared with the case of $0.15 < N/C < 1$ and hence the sintered body having a high strength can be obtained.

Moreover, the reason why the high-pressure phase boron nitride sintered body is required to have a fine structure is due to the fact that if coarse particle is existent in the sintered body, it easily becomes a starting point of breakage and once the breakage is caused, a large damage tends to be caused as compared with the sintered body comprised of fine particles.

The intermetallic compound may previously be formed by reacting Ti(C,N) with a given metal before the sintering, or may be formed together with the formation of solid solution from TiC and TiN during the sintering. The metal to be combined is required to be selected in accordance with an arriving temperature anticipated when the sintered body is used as a tool. In this connection, Al may be used in case of the cutting generating a relatively small heat, while W, Co and/or Zr may be used in case of the cutting generating a large heat.

The production of the high-pressure phase boron nitride sintered body will be described below.

Various reaction products are obtained by various reactions containing the high-pressure phase boron nitride and the intermetallic compound during the sintering and determine the properties of the sintered body. In order to obtain the properties required in the sintered body, the formation of the brittle compound should be avoided, which is required that the sintering is carried out at a temperature of not lower than 1000° C. On the other hand, in order to avoid the inversion of the high-pressure phase boron nitride into a boron nitride having a lower hardness, it is favorable that the sintering is carried out at a temperature of not higher than 1400° C.

When the sintering pressure is less than 4 GPa, a loading to a super-high pressure generating device can be reduced, while when it is not less than 2.4 GPa, the inversion of the high-pressure phase boron nitride into a boron nitride having a lower hardness is avoided.

Moreover, the sintering time differs in accordance with the use purpose of the sintered body, but is favorable to become short in order to reduce the loading to a super-high pressure generating device. In the invention, the sintering time is preferable to be not more than 10 minutes.

The following examples are given in illustration of the invention and are not intended as limitations thereof.

EXAMPLE 1

In an oscillation mill pot of a super-hard alloy are mixed 72% by weight of titanium carbide (average particle size: 1.2 μm, $TiC_{0.65}$), 8% by weight of titanium nitride (average particle size: 1.5 μm, $TiN_{0.67}$) and 20% by weight of aluminum (average particle size: 10 μm).

The resulting mixed powder is shaped into a pellet and reacted at 1100° C. for 50 minutes to form an intermetallic compound. This intermetallic compound is pulverized in toluene in a ball mill pot of a super-hard alloy to form powder having an average particle size of 2.0 μm as a binder, in which N/C is 0.11.

Then, 50% by weight of the binder, 2% by weight of wBN (average particle size: 2.0 μm) and 48% by weight of cBN (average particle size: 3.0 μm) are mixed in an oscillation mill pot of a super-hard alloy.

The resulting mixed powder is pressed into a disc having a diameter of 40 mm and a thickness of 2.5 mm, which is sealed in a zirconium capsule having a thickness of 0.5 mm together with a disc having a diameter of 40 mm and a thickness of 2.5 mm and obtained by pressing powder of a super-hard alloy cemented carbide containing 7% by weight of cobalt.

The capsule is placed in a belt-type super-high pressure generating device, at where the sintering is carried out at a temperature of 1450° C. under a pressure of 3.9 GPa for 10 minutes. Thereafter, the supply of power is stopped and the pressure is released to take out the capsule from the device.

After zirconium is cut and removed out from the capsule with a grindstone of silicon carbide, surface grinding is carried out with a diamond grindstone to obtain a desired disc-shaped composite sintered body.

In the resulting high-pressure phase boron nitride/super-hard alloy composite sintered body, a micro-Vickers hardness of a surface of the high-pressure phase boron nitride (load: 1 kg) is 3500 kg/mm².

A tip of an isosceles triangle (length of a side: 4 mm, interior angle defined containing these sides: 80°) is cut out from the composite sintered body by means of a wire electrical discharge machine and bonded onto a substrate of a super-hard alloy with a silver solder, which is finished into a shape of TNMA 332 (25°X 0.1 for chamfer honing according to JIS B-4123).

Then, the cutting test is conducted by setting the above tip onto a commercially available clamp-type holder. In this test, a rod of SCM 420 steel having a diameter of 50 mm and a length of 350 mm is used after being subjected to a heat treatment so as to have a C-scale Rockwell hardness of 57 as a material to be cut. The cutting is carried out under dry conditions that a peripheral speed is 150 m/min, a depth of cut is 0.5 mm and a feed rate is 0.15 mm/rev. A breadth of flank wear of the cutting tip is 0.3 mm after 30 minutes of the cutting, and the cut state is normal.

EXAMPLE 2

A sintered body is produced in the same manner as in Example 1 except that 75% by weight of titanium carbide (average particle size: 1.0 μm, $TiC_{0.75}$), 5% by weight of titanium nitride (average particle size: 1.3 μm, $TiN_{0.80}$), 18% by weight of aluminum (average particle size: 10 μm), 1% by weight of tungsten (average particle size: 1.0 μm) and 1% by weight of cobalt (average particle size: 4.0 μm) are used. In this case, N/C is 0.06.

The cutting test is carried out with respect to the resulting sintered body in the same manner as in Example 1. The cutting is carried out under dry conditions that a peripheral speed is 130 m/min, a depth of cut is 0.3 mm and a feed rate is 0.10 mm/rev. A breadth of flank wear of the cutting tip is 0.25 mm after 45 minutes of the cutting, and the cut state is normal.

EXAMPLE 3

A sintered body is produced in the same manner as in Example 1 except that 73% by weight of titanium carbide (average particle size: 0.9 μm, $TiC_{0.95}$), 7% by weight of titanium nitride (average particle size: 1.3 μm, $TiN_{0.70}$), 19% by weight of aluminum (average particle size: 10 μm) and 1% by weight of zirconium (average particle size: 1.5 μm) are used. In this case, N/C is 0.10.

The cutting test is carried out with respect to the resulting sintered body in the same manner as in Example 1. The cutting is carried out under dry conditions that a peripheral speed is 155 m/min, a depth of cut is 0.3 mm and a feed rate is 0.07 mm/rev. A breadth of flank wear of the cutting tip is 0.25 mm after 35 minutes of the cutting, and the cut state is normal.

EXAMPLE 4

A sintered body is produced in the same manner as in Example 1 by varying a ratio of wBN content to cBN content as shown in FIG. 1.

The cutting test is carried out with respect to the resulting sintered body in the same manner as in Example 1. An interrelation containing a time required till the breadth of flank wear of the tool arrives at 0.3 mm (VB=0.3) and the ratio of wBN content to cBN content is shown in FIG. 1.

As seen from the result of FIG. 1, the influence of the ratio of wBN content to cBN content upon the cutting performance is small.

EXAMPLE 5

Figure 2:
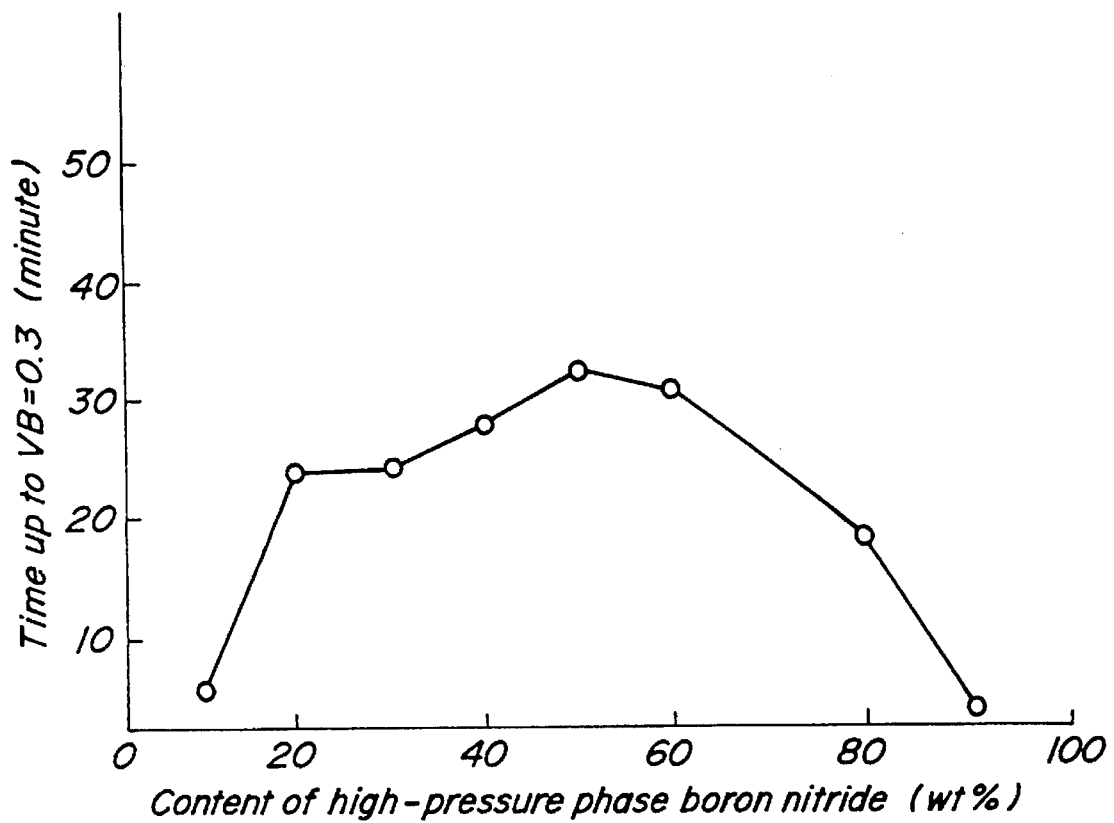
FIG. 2 is a graph showing a relation containing wearing time and a content of high-pressure phase boron nitride.

A sintered body is produced in the same manner as in Example 1 by varying only a content of high-pressure phase boron nitride as shown in FIG. 2.

The cutting test is carried out with respect to the resulting sintered body in the same manner as in Example 1. An interrelation containing a time required till the breadth of flank wear of the tool arrives at 0.3 mm (VB=0.3) and the content of high-pressure phase boron nitride is shown in FIG. 2.

As seen from the result of FIG. 2, when the content of high-pressure phase boron nitride is less than 20% by weight, the abrasion resistance is poor, while when it exceeds 80% by weight, the resistance to wearing-away is poor.

EXAMPLE 6

Figure 3:
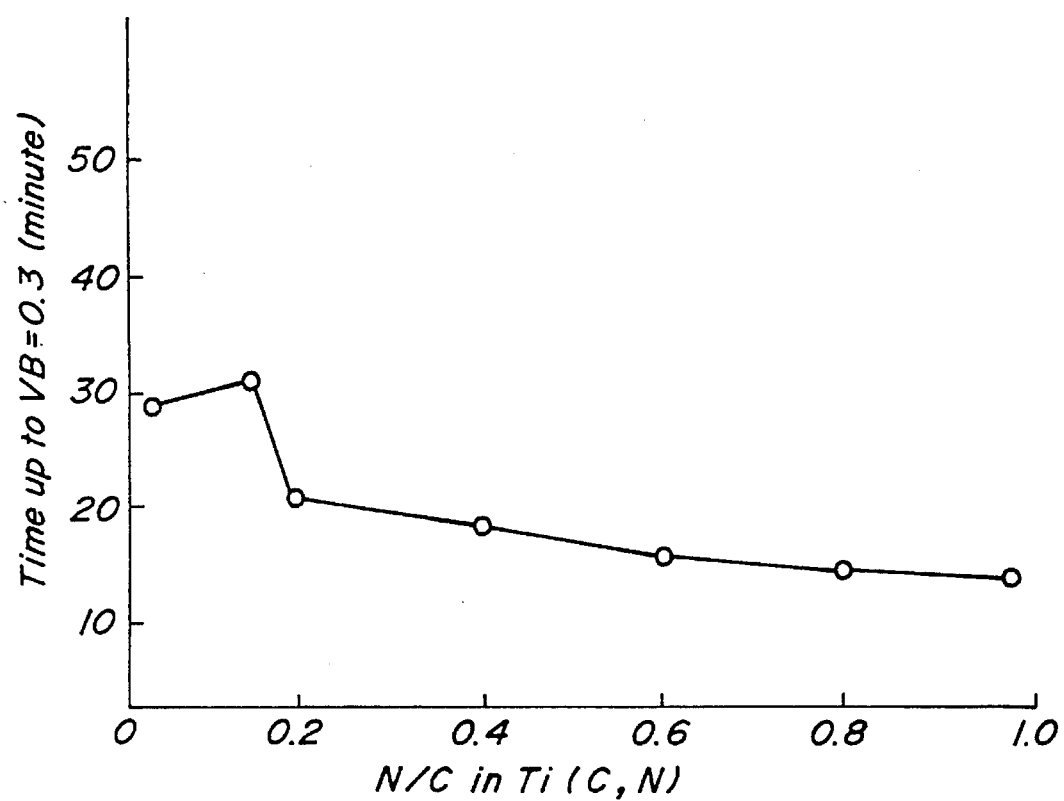
FIG. 3 is a graph showing a relation containing wearing time and N/C.

A sintered body is produced in the same manner as in Example 1 by varying a composition ratio of titanium carbide (average particle size: 1.2 μm, $TiC_{0.65}$) and titanium nitride (average particle size: 1.5 μm, $TiN_{0.67}$) as shown in FIG. 3.

The cutting test is carried out with respect to the resulting sintered body in the same manner as in Example 1. An interrelation containing a time required till the breadth of flank wear of the tool arrives at 0.3 mm (VB=0.3) and N/C is shown in FIG. 3.

As seen from the result of FIG. 3, the influence of the composition ratio of the binder upon the cutting performance is relatively small. When the required properties are under severe use conditions, the abrasion becomes large at 0.15<N/C<1 and the wearing-away of the tool may undesirably be caused. In this case, when N/C is not more than 0.15, the flank wear is small and the good cutting performance is obtained.

EXAMPLE 7

A sintered body is produced in the same manner as in Example 1 except that the sintering pressure is 1.9 GPa (outside the range defined in the invention) and the sintering temperature is 1450° C.

The micro-Vickers hardness (load: 1 kg) of the surface of high-pressure phase boron nitride in the sintered body is 1500 kg/mm$^2$ when being measured by the same method as in Example 1.

As a result of X-ray diffraction analysis of the composite sintered body, the inversion of the high-pressure phase boron nitride into low-pressure phase is caused and the composite sintered body is not usable as a cutting tool.

EXAMPLE 8

A sintered body is produced in the same manner as in Example 1 except that the sintering pressure is 3.9 GPa and the sintering temperature is 900° C. (outside the range defined in the invention).

The micro-Vickers hardness (load: 1 kg) of the surface of high-pressure phase boron nitride in the sintered body is 1000 kg/mm$^2$ when being measured by the same method as in Example 1. The resulting composite sintered body is not usable as a cutting tool.

EXAMPLE 9

A sintered body is produced in the same manner as in Example 1 except that the sintering time is 20 minutes.

The micro-Vickers hardness (load: 1 kg) of the high-pressure phase boron nitride surface in the high-pressure phase boron nitride/super-hard alloy composite sintered body is 3750 kg/mm$^2$.

The cutting test is carried out with respect to the sintered body in the same manner as in Example 1. After 20 minutes of the cutting, the cutting tip is worn away. When the sintered body is examined in detail by means of a scanning type electron microscope, the particles of the binder in the sintered body grow to form coarse particles, which are considered to bring about the wearing-away of the cutting tip.

Since the high-pressure phase boron nitride sintered body for cutting tools according to the invention have high strength and excellent abrasion resistance, which have never been attained in the conventional technique, when the sintered body is used as a cutting tool, the improved cutting performance is obtained and the service life is prolonged.

In the production method according to the invention, the sintered body can be produced at the sintering temperature and pressure lower than those of the conventional technique, so that the service life of the production device can be prolonged and also it is possible to manufacture tools cheaply. Therefore, the invention is very useful in industry.

What is claimed is:

1. A high-pressure phase boron nitride sintered body for cutting tools consisting of (1) 20–80% by weight of a high-pressure phase boron nitride and (2) 80–20% by weight of an intermetallic compound containing a titanium carbonitride Ti(C,N) in which an atomic weight ratio of nitrogen (N) to carbon (C) is $0.02 \leq N/C \leq 0.15$ and at least one metal selected from the group consisting of Al, W, Co and Zr, the content of metal being 18–20% the content of Al being 18–20 % by weight and the content of W, Co or Zr being not more than 1% by weight.

* * * * *